(12) United States Patent
Liu et al.

(10) Patent No.: US 11,153,631 B2
(45) Date of Patent: Oct. 19, 2021

(54) METHOD AND APPARATUS FOR PLAYING TELEVISION PROGRAM

(71) Applicant: Huawei Technologies Co., Ltd., Shenzhen (CN)

(72) Inventors: Chang Liu, Wuhan (CN); Tao Liu, Wuhan (CN); Jiang Rui, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/758,974

(22) PCT Filed: Nov. 10, 2017

(86) PCT No.: PCT/CN2017/110370
§ 371 (c)(1),
(2) Date: Apr. 24, 2020

(87) PCT Pub. No.: WO2019/090658
PCT Pub. Date: May 16, 2019

(65) Prior Publication Data
US 2020/0351539 A1 Nov. 5, 2020

(51) Int. Cl.
*H04N 21/426* (2011.01)
*H04N 21/414* (2011.01)
(Continued)

(52) U.S. Cl.
CPC . *H04N 21/42607* (2013.01); *H04N 21/41407* (2013.01); *H04N 21/4398* (2013.01);
(Continued)

(58) Field of Classification Search
CPC ....... H04N 21/42607; H04N 21/41407; H04N 21/4398; H04N 21/4402; H04N 21/443;
(Continued)

(56) References Cited

U.S. PATENT DOCUMENTS 6,516,465 B1 * 2/2003 Paskins ................. H04N 7/163
725/25
7,346,917 B2 * 3/2008 Gatto ................... H04N 21/426
725/5
(Continued)

FOREIGN PATENT DOCUMENTS

CN 1674673 A 9/2005
CN 101304496 A 11/2008
(Continued)

*Primary Examiner* — Jefferey F Harold
*Assistant Examiner* — Timothy R Newlin
(74) *Attorney, Agent, or Firm* — Slater Matsil, LLP

(57) ABSTRACT

A terminal device includes an application layer, an operating system layer, a hardware driver layer, and a hardware layer. The operating system layer includes a hardware abstraction layer, and the hardware layer includes a master chip and a television receiver chip. The hardware abstraction layer is disposed between the hardware driver layer and the player application at the application layer, so that the hardware abstraction layer shields the player application from an interface difference of television receiver chips, and provides a unified interface protocol between the player application and the television receiver chip, to be compatible with and support television receiver chips with different interfaces.

17 Claims, 8 Drawing Sheets

(51) Int. Cl.
*H04N 21/439* (2011.01)
*H04N 21/4402* (2011.01)
*H04N 21/443* (2011.01)
*H04N 21/4623* (2011.01)

(52) U.S. Cl.
CPC ....... *H04N 21/4402* (2013.01); *H04N 21/443* (2013.01); *H04N 21/4623* (2013.01)

(58) Field of Classification Search
CPC ......... H04N 21/4623; H04N 21/42623; H04N 21/4431
See application file for complete search history.

(56) References Cited

U.S. PATENT DOCUMENTS

| | | | | |
|---|---|---|---|---|
| 2002/0120790 A1* | 8/2002 | Schwalb | .............. | H04N 21/435 719/328 |
| 2004/0252833 A1* | 12/2004 | Milner | ............... | H04N 21/4623 380/200 |
| 2005/0149478 A1* | 7/2005 | Fahy | ................ | H04N 21/4431 |
| 2005/0177716 A1* | 8/2005 | Ginter | .................... | G06F 21/10 713/157 |
| 2005/0251832 A1* | 11/2005 | Chiueh | .............. | H04N 21/2187 725/62 |
| 2006/0026689 A1* | 2/2006 | Barker | .................... | G06F 21/31 726/26 |
| 2006/0130072 A1* | 6/2006 | Rhoten | ..................... | G06F 9/44 719/321 |
| 2006/0212902 A1* | 9/2006 | Seo | .................... | H04N 5/44543 725/39 |
| 2007/0088812 A1* | 4/2007 | Clark | .................. | H04N 21/8153 709/223 |
| 2007/0233779 A1* | 10/2007 | Gaos | ................ | H04N 21/44231 709/202 |
| 2008/0083000 A1* | 4/2008 | Orrell | ................ | H04N 21/4332 725/53 |
| 2011/0096234 A1* | 4/2011 | Mamidwar | ........ | H04N 21/4385 348/501 |
| 2011/0225620 A1* | 9/2011 | Yeh | ..................... | H04N 21/4181 725/127 |
| 2012/0176546 A1* | 7/2012 | Yoon | .................. | H04N 21/4431 348/600 |
| 2014/0115330 A1* | 4/2014 | Chen | ..................... | H04L 63/105 713/166 |
| 2014/0115646 A1* | 4/2014 | Rajgopal | ............ | H04N 21/4622 725/110 |
| 2014/0331268 A1* | 11/2014 | Kim | .................... | H04N 21/4346 725/116 |
| 2016/0227276 A1* | 8/2016 | Zou | ...................... | H04N 21/443 |

FOREIGN PATENT DOCUMENTS

| | | |
|---|---|---|
| CN | 102196308 A | 9/2011 |
| CN | 202206509 U | 4/2012 |
| CN | 104333808 A | 2/2015 |
| CN | 104506925 A | 4/2015 |
| CN | 104735235 A | 6/2015 |
| CN | 105554571 A | 5/2016 |
| CN | 105933767 A | 9/2016 |
| CN | 107040660 A | 8/2017 |
| KR | 20050002170 A | 1/2005 |

\* cited by examiner

METHOD AND APPARATUS FOR PLAYING TELEVISION PROGRAM

CROSS-REFERENCE TO RELATED APPLICATIONS

This application is a national stage of International Application No. PCT/CN2017/110370, filed on Nov. 10, 2017, which is hereby incorporated by reference in its entirety.

TECHNICAL FIELD

This application relates to the digital television field, and in particular, to a method and an apparatus for playing a television program.

BACKGROUND

A digital television (Digital Television, DTV) is a system that implements digitalization from collection, production, and transmission of a television program to receiving of the television program by a user terminal. A user can watch a digital broadcast television in real time anytime and anywhere by using a mobile terminal such as a tablet, a mobile phone, or a laptop.

For a principle of an existing method for playing a DTV on a mobile terminal, refer to FIG. 1. FIG. 1 is a schematic diagram of a method for playing a television program on a mobile terminal. As shown in FIG. 1, the mobile terminal mainly includes a processor, a television receiver chip, and an audio and video player. The processor loads a DTV driver and a DTV application. The loaded DTV application performs the following operations: when receiving an instruction entered by a user to order a television program, obtaining, from the television receiver chip by using a first interface function and the DTV driver, data streams corresponding to television channels; and parsing a data stream that is of a television channel specified by the user and that is obtained through demodulation, and sending, by using a second interface function, audio and video data obtained through parsing to the audio and video player for playing, so as to play the television program specified by the user. The first interface function uses an interface protocol of a datasource Datasource class, and the second interface function uses an interface protocol of a mediaextractor MediaExtractor class. The interface protocol of the datasource Datasource class is responsible for first caching a bitstream received and demodulated by the television receiver chip to a memory of the mobile terminal. Then, the interface protocol of the mediaextractor MediaExtractor class reads the bitstream from the memory and parses the bitstream to obtain audio data and video data; and finally, invokes a corresponding audio and video player based on formats of the audio data and the video data for decoding and plays the audio data and the video data synchronously.

In this solution, the interface protocol of the datasource Datasource class and the interface protocol of the mediaextractor MediaExtractor class are interface protocols used by an Android system to play local audio and video files. Therefore, this solution is no longer compatible with a television receiver chip using another interface. In other words, a set of interface protocols need to be specially formulated to adapt to television receiver chips with different interfaces, and therefore compatibility is poor.

SUMMARY

This application provides a method and an apparatus for playing a television program, to be compatible with television receiver chips with different interfaces.

According to a first aspect, this application provides a method for playing a television program. The method is applied to a terminal device. The terminal device includes an application layer, an operating system layer, a hardware driver layer, and a hardware layer. The operating system layer includes a hardware abstraction layer, and the hardware layer includes a master chip and a television receiver chip. The method includes: receiving, by the hardware abstraction layer through a first interface, a bitstream obtaining command sent by a player application at the application layer, where the bitstream obtaining command is used to request to obtain a bitstream of a target television program selected by a user; sending, by the hardware abstraction layer, a bitstream obtaining instruction to a first driver at the hardware driver layer through a second interface, where the first driver is a driver of the television receiver chip on the terminal device; executing, by the first driver, the bitstream obtaining instruction, so that the television receiver chip receives the bitstream of the target television program; obtaining, by the hardware abstraction layer, the bitstream of the target television program from the television receiver chip through the second interface; sending, by the hardware abstraction layer, the bitstream of the target television program to the player application through the first interface; and decoding, by the player application, the bitstream of the target television program, and playing decoded audio and video data.

In this embodiment of this application, the hardware abstraction layer is disposed between the hardware driver layer and the player application at the application layer, so that the hardware abstraction layer shields the player application from an interface difference of television receiver chips, and provides a unified interface protocol between the player application and the television receiver chip, to be compatible with and support television receiver chips with different interfaces.

With reference to the first aspect, in some implementations of the first aspect, the obtaining, by the hardware abstraction layer, the bitstream of the target television program from the television receiver chip through the second interface includes: obtaining, by the hardware abstraction layer, the bitstream of the target television program from a transport stream interface TSI through the second interface, where the TSI is a channel for transmitting TS bitstream data between the master chip and the television receiver chip that are of the terminal device.

In the technical solution of this application, the TSI is the channel for transmitting the TS bitstream data between the master chip and the television receiver chip, and the TSI channel is applicable to a scenario in which data needs to be transferred between the chips. Usually, the data does not need to be transferred between the chips during local playing and media playing. However, in this embodiment of this application, to support to play a television program by using a higher-resolution bitstream, bitstream data of the television program is transferred from the television receiver chip through the TSI channel, so that the television program with a 1080i or higher-resolution bitstream can be played, to improve image playback quality, so as to improve user experience of watching the television program.

With reference to the first aspect, in some implementations of the first aspect, before the player sends the bitstream obtaining command, the method further includes: sending, by the player application, a cyclic channel search command to the hardware abstraction layer through the first interface; sending, by the player application, a first key operation command to the hardware abstraction layer through the first interface; sending, by the hardware abstraction layer, a cyclic channel search instruction to the first driver through the second interface; executing, by the first driver, the cyclic channel search instruction, so that the television receiver chip searches for television signals of all television channels, and outputs a television program list based on the found television signals; returning, by the first driver, the television program list to the hardware abstraction layer through the second interface; parsing, by the hardware abstraction layer, an EMM and a first ECM that are of the target television program based on the first key operation command, and storing the EMM; calculating, by the hardware abstraction layer, a first temporary descrambling key of the target television program based on the EMM and the first ECM; storing, by the hardware abstraction layer, the first temporary descrambling key of the target television program; and returning, by the hardware abstraction layer, the television program to the player application through the first interface.

It should be noted that a change period of the EMM is relatively long, and is usually more than several days. However, the ECM changes very frequently and changes basically every second. Therefore, in this embodiment of this application, when the user chooses to watch a television program for the first time, the hardware abstraction layer parses an EMM and an ECM that are of the television program, and stores the EMM. In addition, the hardware abstraction layer calculates a temporary descrambling key of the television program based on the EMM and the ECM, and stores the temporary descrambling key. Because the ECM changes very frequently, the hardware abstraction layer needs to reparse the ECM each time the user selects a television program. Even if a television program that has just been watched, the ECM also needs to be reparsed. However, the hardware abstraction layer uses the stored temporary descrambling key of the television program to check the EMM, to determine whether the EMM of the television program has changed. If the check on the EMM fails, it indicates that the EMM has changed. In this case, the hardware abstraction layer needs to reparse the EMM of the television program. If the check succeeds, the EMM does not need to be reparsed. If the EMM does not change, a time for parsing the EMM can be reduced by approximately 3 to 10 seconds. Because the change period of the EMM is usually more than several days, the time for parsing the EMM can be reduced in most cases in this solution.

Optionally, before the player application sends the bitstream obtaining command, the method further includes: sending, by the player application, a cyclic channel search command to the hardware abstraction layer through the first interface; sending, by the player application, a first key operation command to the hardware abstraction layer through the first interface; sending, by the hardware abstraction layer, the cyclic channel search command to the first driver through the second interface; executing, by the first driver, the cyclic channel search instruction, so that the television receiver chip searches for television signals of all television channels, and outputs a television program list based on the found television signals; returning, by the first driver, the television program list to the hardware abstraction layer through the second interface; parsing, by the hardware abstraction layer, an EMM and a first ECM that are of a current television program based on the first key operation command, and storing the EMM; calculating, by the hardware abstraction layer, a first temporary descrambling key of the current television program based on the EMM and the first ECM, and storing the first temporary descrambling key of the current television program; and returning, by the hardware abstraction layer, the television program list to the player application through the first interface.

It should be understood that the current television program may be a last watched television program in a record that is of watching a television program by the user and that is stored in the player application. Alternatively, if the user uses the player application for the first time to watch a television program, the current television program may be any one of television programs found in a cyclic channel search process.

When a conventional DTV player application plays a television program, and the DTV player application receives a channel selection or channel switching instruction of the user, if a television program selected by the user is scrambled, the DTV player starts to calculate a descrambling key in this case and then performs descrambling. Consequently, the user waits for a relatively long time, and experience is poor.

However, in the technical solution of this application, during a cyclic channel search, the player application sends a key operation command to an invoked hardware abstraction layer, and the hardware abstraction layer calculates and stores the descrambling key of the television program. Subsequently, if the user selects the television program, the player application may request to obtain the descrambling key of the television program from the hardware abstraction layer, and directly descramble the television program based on the descrambling key returned by the hardware abstraction layer. As proved by practice, in the descrambling procedure in this embodiment of this application, in some channel switching or channel selection scenarios, a time of the descrambling procedure may be shortened by approximately 3 to 15 seconds, to improve user experience.

With reference to the first aspect, in some implementations of the first aspect, before the decoding, by the player application, the bitstream of the target television program, the method further includes: determining, by the player application, whether the bitstream of the target television program is scrambled; if the bitstream of the target television program is scrambled, obtaining, by the player application, the first temporary descrambling key of the target television program from the hardware abstraction layer through the first interface; and descrambling, by the player application, the scrambled bitstream of the target television program by using the first temporary descrambling key; and the decoding, by the player application, the bitstream of the target television program, and playing decoded audio and video data includes: if the descrambling succeeds, decoding, by the player application, the descrambled bitstream, and playing the decoded audio and video data.

With reference to the first aspect, in some implementations of the first aspect, if the descrambling fails, the method further includes: sending, by the player application, a second key operation command to the hardware abstraction layer through the first interface; parsing, by the hardware abstraction layer, a second ECM of the target television program based on the second key operation command; calculating, by the hardware abstraction layer, a second temporary descrambling key of the target television program based on the second ECM and the stored EMM; replacing, by the hardware abstraction layer, the stored first temporary descrambling key with the second temporary descrambling key; returning, by the hardware abstraction layer, the second temporary descrambling key to the player application; and descrambling, by the player application, the target television program by using the second temporary descrambling key.

With reference to the foregoing implementations, if the descrambling fails, the hardware abstraction layer reparses the ECM of the target television program to obtain the second ECM. Then, the hardware abstraction layer calculates the second temporary descrambling key of the target television program based on the second ECM obtained through reparsing and the stored EMM, and replaces the previously stored first temporary descrambling key with the second temporary descrambling key.

With reference to the first aspect, in some implementations of the first aspect, the method further includes: sending, by the player application, an initialization command to the hardware abstraction layer through the first interface based on an instruction entered by the user to start the player application; sending, by the hardware abstraction layer, an initialization instruction to the first driver through the second interface; and executing, by the first driver, the initialization instruction, to perform an initialization operation on the television receiver chip.

With reference to the first aspect, in some implementations of the first aspect, the method further includes: sending, by the hardware abstraction layer, an initialization instruction to a second driver through the second interface, where the second driver is a driver on the transport stream interface TSI; and executing, by the second driver, the initialization instruction to initialize the TSI.

With reference to the first aspect, in some implementations of the first aspect, when the player application sends the bitstream obtaining command to the hardware abstraction layer, the method further includes: sending a television signal parameter collection command to the hardware abstraction layer through the first interface; sending, by the hardware abstraction layer, a television signal parameter collection instruction to the first driver through the second interface; executing, by the first driver, the television signal parameter collection instruction, so that the television receiver chip collects a television signal parameter of a target television channel, where the television signal parameter of the target television channel is used to indicate quality of a television signal of the target television channel, and the target television channel is a television channel on which the target television program is sent; receiving, by the hardware abstraction layer through the second interface, a television signal parameter that is of each television channel and that is returned by the first driver; receiving, by the player application through the first interface, the television signal parameter that is of each television channel and that is returned by the hardware abstraction layer; and determining, by the player application, a playback policy of each television channel based on the television signal parameter of each television channel; and the decoding, by the player application, the bitstream of the target television program, and playing decoded audio and video data includes: decoding, by the player application, the bitstream of the target television program, and playing the decoded audio and video data according to a playback policy of the target television program.

The player application may learn of the quality of the television signal of each television channel based on the television signal parameter of each television channel. Based on this, the player application can formulate corresponding playback policies for different television channels. For example, if the user selects a television channel with poorer television signal quality to watch a television program, the player application may reduce playback resolution (for example, standard definition), to ensure smooth playback. However, if the user selects a television channel with better television signal quality, the player application performs playback at higher resolution (for example, high definition), to improve image playback quality. In this way, user experience of watching the television program can be further improved as a whole.

With reference to the first aspect, in some implementations of the first aspect, the method further includes: sending, by the player application, a disabling command to the hardware abstraction layer through the first interface based on an instruction entered by the user to exit the player application; sending, by the hardware abstraction layer, a disabling instruction to the first driver through the second interface; and executing, by the first driver, the disabling instruction, to perform a disabling operation on the television receiver chip.

With reference to the first aspect, in some implementations of the first aspect, the method further includes: sending, by the hardware abstraction layer, the disabling instruction to the second driver through the second interface; and executing, by the second driver, the disabling instruction to disable the TSI.

According to a second aspect, this application provides an apparatus for playing a television program. The apparatus has functions of implementing the method according to the first aspect. These functions may be implemented by hardware, or may be implemented by hardware executing corresponding software. The hardware or the software includes one or more units corresponding to the foregoing functions.

According to a third aspect, this application provides a terminal device. The terminal device includes a transceiver, a processor, and a memory. The processor is configured to control the transceiver to receive and send signals. The memory is configured to store a computer program. The processor is configured to: invoke the computer program from the memory and run the computer program, so that the terminal device performs the method according to the first aspect.

According to a fourth aspect, this application provides a computer program product. The computer program product includes computer program code, and when the computer program code is run on a computer, the computer is enabled to perform the method according to the first aspect.

According to a fifth aspect, this application provides a computer readable medium. The computer readable medium stores program code, and when the computer program code is run on a computer, the computer is enabled to perform the method according to the first aspect.

According to a sixth aspect, this application provides a chip system. The chip system includes a processor, configured to support a terminal device in implementing a function in the method according to the first aspect, for example, receiving or processing data and/or information in the method. In a possible design, the chip system further includes a memory. The memory is configured to store a program instruction and data that are necessary for the terminal device. The chip system may include a chip, or may include a chip and another discrete device.

Optionally, the memory and the memory may be physically independent units, or the memory may be integrated into the processor.

In the embodiments of this application, the hardware abstraction layer is disposed between the hardware driver layer and the player application layer, so that the hardware abstraction layer shields the player application from the interface difference of television receiver chips, and provides the unified interface protocol between the player application and the television receiver chip, to be compatible with and support the television receiver chips with different interfaces, so as to improve compatibility with the television receiver chip.

DETAILED DESCRIPTION OF ILLUSTRATIVE EMBODIMENTS

The following describes technical solutions of this application with reference to the accompanying drawings.

The technical solutions of this application may be applied to various terminal devices. For example, the terminal device may be a mobile phone, a tablet personal computer (Tablet Personal Computer), a media player, a smart television, a laptop computer (Laptop Computer), an ultra-mobile personal computer (Ultra-mobile Personal Computer, UMPC), a netbook, a personal digital assistant (personal digital assistant, PDA), a personal computer (Personal Computer), a mobile internet apparatus (Mobile Internet Device, MID), or a wearable device (Wearable Device) such as a smartwatch. This is not limited in this application.

Figure 2:
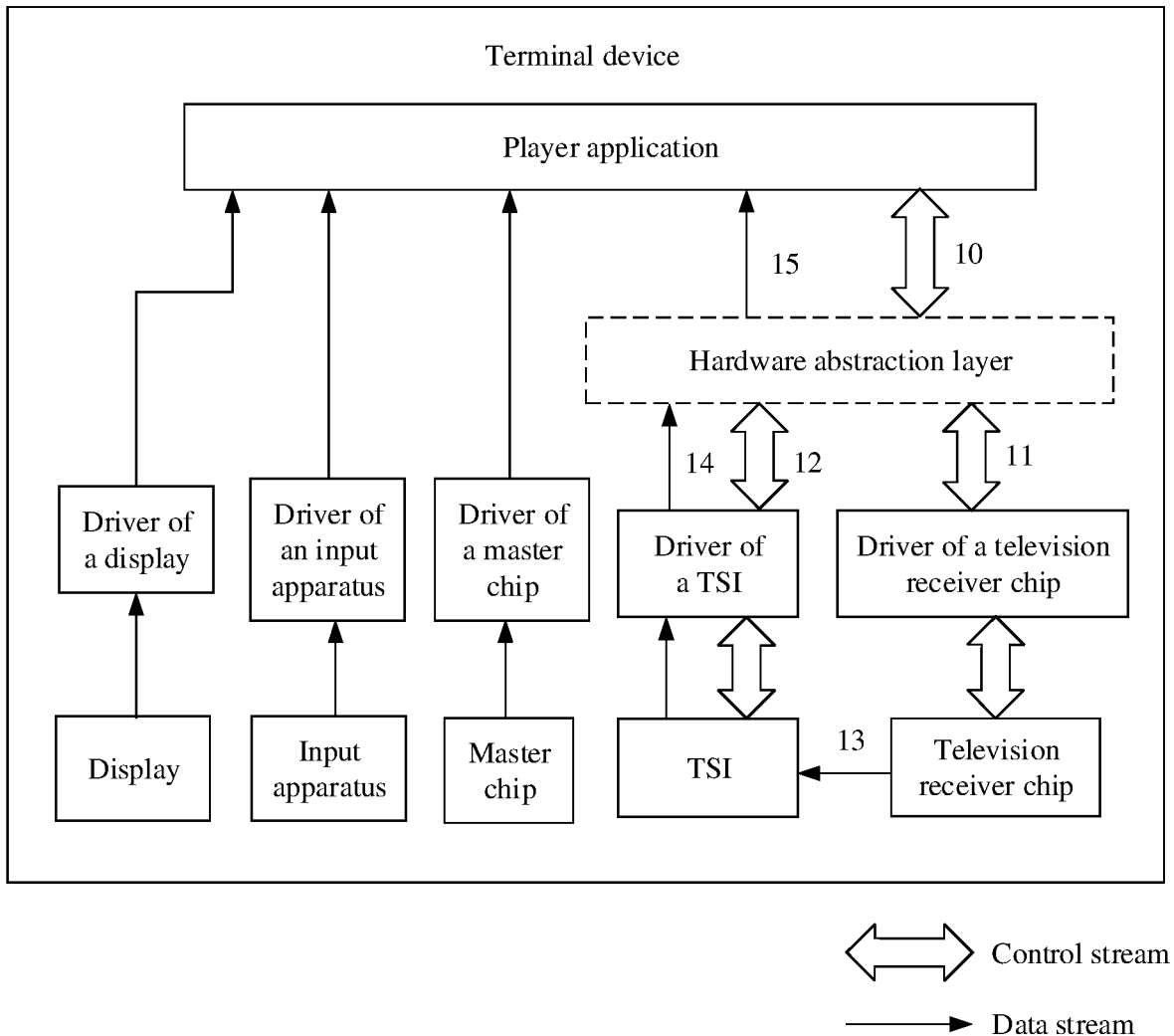
FIG. 2 is a diagram of an architecture of an apparatus 100 for playing a television program according to an embodiment of this application.

FIG. 2 is a diagram of an architecture of an apparatus 100 for playing a television program according to an embodiment of this application. Referring to FIG. 2, the architecture of the apparatus 100 includes an application layer, an operating system layer, a hardware driver layer, and a hardware layer. The operating system layer includes a hardware abstraction layer. Specifically, in this embodiment of this application, a player application belongs to the application layer. A driver of a television receiver chip, a driver of a transport stream interface (Transport Stream Interface, TSI), a driver of an input apparatus, and a driver of a display belong to the hardware driver layer. The television receiver chip, the TSI, the input apparatus, and the display are hardware.

It may be understood that the input apparatus is configured to receive input from a user, for example, an apparatus used by the user to select a television program or enter an instruction for channel selection, channel switching, or volume adjustment. The display is used to display the television program. In addition, the terminal device may further include another component such as a camera, a sensor, a speaker, or a microphone (not shown in FIG. 2).

In this embodiment of this application, the hardware abstraction layer defines an interface function between the upper-layer player application and the bottom-layer television receiver chip, and provides a unified interface protocol between the upper-layer player application and the bottom-layer television receiver chip. The hardware abstraction layer separates the player application from the hardware driver layer, so that the player application and the hardware driver layer no longer directly communicate with each other, but exchange information and data by using the hardware abstraction layer.

In other words, the hardware abstraction layer provides an interface (referred to as a first interface in this application) for the player application upward, and provides an interface (referred to as a second interface in this application) for the hardware driver layer downward.

In a method for playing a television program in this application, the player application sends a control command to the hardware abstraction layer through a first interface 10; the hardware abstraction layer sends an instruction to the driver of the television receiver chip through a second interface 11 based on the control command; and the driver of the television receiver chip executes the instruction, to perform a corresponding operation on the television receiver chip, and returns, by using the hardware abstraction layer, a result of performing the operation to the player application. In this way, control of the television receiver chip by the player application is implemented. When the television receiver chip provides a bitstream of a television program for the player application, the driver of the TSI returns, to the hardware abstraction layer through a second interface 14, bitstream data that is of the television program and that is received by the television receiver chip, and then the hardware abstraction layer returns the bitstream data to the player application through a first interface 15.

It should be understood that the interfaces 10 and 15 shown in FIG. 2 are examples of the first interface. The interface 11, an interface 12, and the interface 14 are examples of the second interface. In addition, the TSI shown in FIG. 2 is merely an example of an interface used to transmit data and/or information between the television receiver chip and a master chip, or may be another interface.

It should be further understood that the player application and drivers (or driver programs) of all underlying hardware shown in FIG. 2 are run on the master chip.

It should be noted that a function of the driver (Device Driver) is to complete mutual translation between a signal of a hardware device and a programming language of an operating system or an upper-layer application. In other words, the driver provides an interface between the hardware and the operating system or the upper-layer application, and the operating system or the upper-layer application can control work of the hardware only by using the driver. For example, if the operating system needs to control an audio card to play music, the operating system first sends a corresponding instruction to a driver of the audio card. After receiving the instruction, the driver of the audio card translates the instruction into a signal that can be understood by the audio card, so that the audio card plays music.

Figure 1:
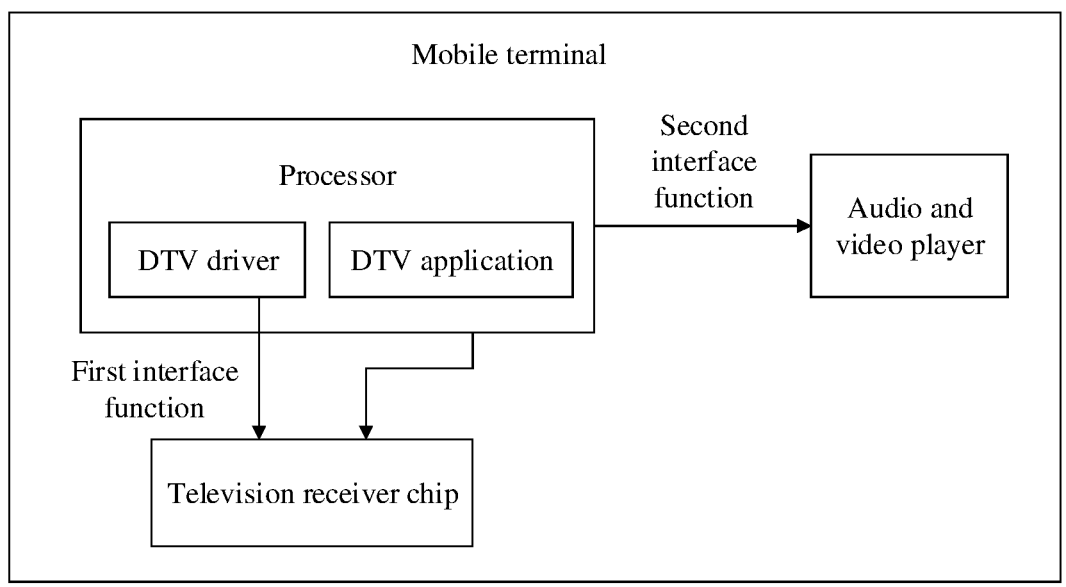
FIG. 1 is a schematic diagram of a method for playing a television program on a mobile terminal.

However, in this embodiment of this application, the hardware abstraction layer and the driver are different from each other. As shown in FIG. 1, first, from a perspective of the system architecture, the hardware abstraction layer belongs to the operating system layer, and is located between the driver of the television receiver chip and the upper-layer player application. In addition, the hardware abstraction layer does not need to perform "language translation" between the player application and the driver of the television receiver chip, but provides a unified interface protocol between the player application and the television receiver chip. Therefore, the hardware abstraction layer can shield the upper-layer player application from an interface difference of bottom-layer television receiver chips, to improve compatibility with the television receiver chip.

In this embodiment of this application, the hardware abstraction layer may also be referred to as a hardware abstraction interface protocol layer. In other words, the hardware abstraction layer is essentially a set of interface functions, provides the first interface for the upper-layer application, and provides the second interface for the hardware driver layer.

It may be understood that under the control of the player application, the underlying hardware cannot implement play of a television program by performing only one operation, but needs to perform a plurality of operations to play the television program. Therefore, in this embodiment of this application, the hardware abstraction layer is divided into several mutually independent modules (or several parts) based on functions that can be implemented by controlling, by using an interface protocol of the hardware abstraction layer, the underlying hardware to perform corresponding operations. Each module is an interface function or a set of a plurality of interface functions. The player application can control, by invoking these modules in sequence, the underlying hardware to perform a series of operations (such as initialization, a cyclic channel search, and bitstream obtaining), so as to finally play the television program.

The following separately describes modules in the interface protocol provided by the hardware abstraction layer.

Figure 3:
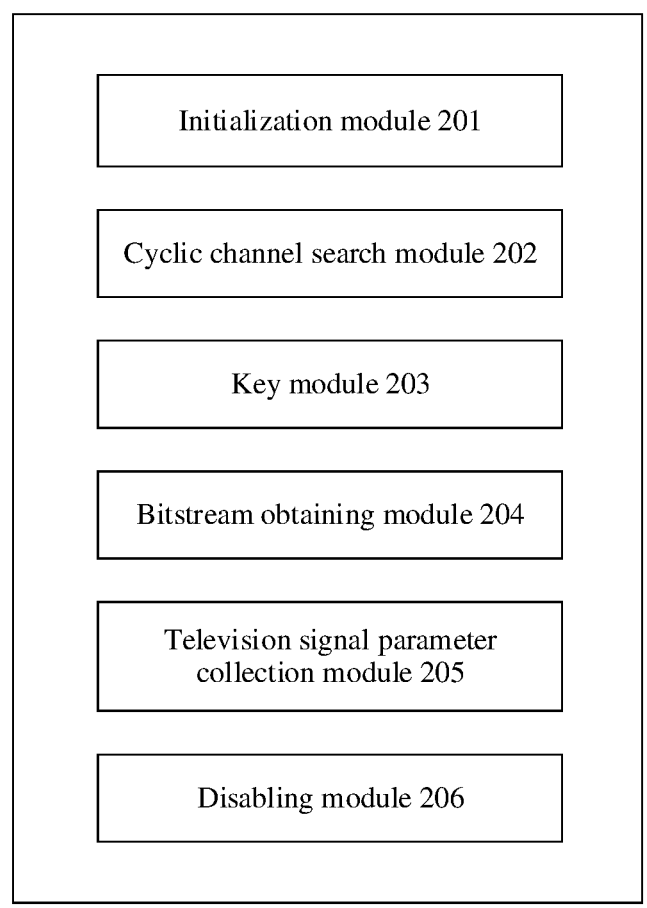
FIG. 3 is a structural diagram of a hardware abstraction layer according to an embodiment of this application.

FIG. 3 is a structural diagram of a hardware abstraction layer according to an embodiment of this application. As shown in FIG. 3, the hardware abstraction layer includes an initialization module 201, a cyclic channel search module 202, a key module 203, a television signal parameter collection module 204, a bitstream obtaining module 205, and a disabling module 206. The key module 203 and the television signal parameter collection module 204 are optional. An upper-layer player application can control, by invoking a corresponding module at the hardware abstraction layer, a television receiver chip to perform a corresponding operation. The following describes a specific operation procedure in detail. Functions of the modules are first described as follows:

Initialization Module 201:

The player application can control, by invoking the initialization module 201, the television receiver chip to complete initialization. The initialization of the television receiver chip includes power on, chip self-test, and the like of the television receiver chip, to prepare the television receiver chip for receiving a television signal. The initialization module 201 may be a reference function Public int TunnerStart ( ).

In the prior art, a bitstream of a television program is transmitted between the television receiver chip and a master chip of a terminal device through a serial peripheral interface (Serial Peripheral Interface, SPI). A rate of the bitstream transmitted through the SPI interface is relatively low, and a common maximum rate is 24 Mbps.

Considering that a general television receiver chip has a controller (referred to as a TS controller below) dedicated to transmitting a TS stream, this application proposes to design the TS controller on a master chip (also referred to as a processor chip or a processor system chip), or select a master chip (for example, a Kirin 650 chip) with a TS controller, to implement the method for playing a television program provided in this application, so that the bitstream of the television program can be transmitted between the television receiver chip and the master chip through a TSI. Compared with the conventional SPI, the TSI can transmit a bitstream at a higher rate (a common maximum rate is 48 MHz), to improve resolution of playing the television program.

When the TS controller is designed on the master chip, a plurality of TSIs can be implemented by designing a hardware circuit or by performing shunting by using a software solution. The TS controller may be disposed on the master chip, or may be a component independent of the master chip.

Correspondingly, if the TSI is used as a channel for transmitting a bitstream of a television program, the player application further invokes the initialization module 201 to control the TSI to complete initialization in addition to controlling the television receiver chip to complete initialization.

Cyclic Channel Search Module 202:

The player application can control, by invoking the cyclic channel search module 202, the television receiver chip to search for television signals of all television channels, and output a television program list based on the found television signals.

The cyclic channel search module 202 may be a reference function: public int tunerxCsTuning(IN int tunerBand, IN int ch, OUT int[ ] lockFlg).

Key Module 203:

The player application can calculate a descrambling key of a scrambled television program by invoking the key module 203, and store the descrambling key obtained through calculation. The key module 203 may be a reference function N/A.

Television Signal Parameter Collecting Module 204:

The player application can control, by invoking the television signal parameter collection module 204, the television receiver chip to collect a television signal parameter of a television program on a television channel (referred to as a target television channel in this application) specified by a user. It should be noted that a television signal parameter of a television channel may be used to measure quality of a television signal of the television channel.

The television signal parameter collection module 204 may be a reference function: public int tunerxGetMonInfo (inout TunerMonitoringInfo tunerMonitoringInfo) and/or a set of the following reference functions:

int tunerxGetTmccInfo(inout TunerTMCCInfo tunerTMCCInfo);
int tunerxGetRssiInfo(inout TunerRSSIInfo tunerRSSIInfo);
int tunerxGetSyncInfo(inout TunerSyncInfo tunerSyncInfo);
int tunerxGetCnInfo(inout TunerCNInfo tunerACInfo); and
int tunerxGetBper(inout TunerBperInfo tunerBperInfo).

Bitstream Obtaining Module 205:

The player application obtains the bitstream of the television program from the television receiver chip by invoking the bitstream obtaining module 205.

Specifically, if the SPI interface is used between the television receiver chip and the master chip, the bitstream obtaining module obtains the bitstream of the television program from the television receiver chip through the SPI interface. If the TSI is used between the television receiver chip and the master chip, the bitstream obtaining module obtains the bitstream of the television program from the television receiver chip through the TSI.

The bitstream obtaining module 205 may be a set of the following reference parameters:

```
public int tunerxTsStart ( );
public int tunerxTsRead (IN uint32_t * size, OUT uint8_t *data,
IN uint32_t *pktsize); and
public int tunerxTsStop ( ).
```

Disabling Module 206:

The player application controls, by invoking the disabling module 206, the television receiver chip to complete a disabling operation.

It may be understood that if the initialization includes initialization of the television receiver chip and initialization of the TSI, the player application invokes the disabling module 206 to control disabling of the television receiver chip and disabling of the TSI.

Based on the foregoing description of the hardware abstraction layer, a person skilled in the art may understand that the player application invokes a module at the hardware abstraction layer, in other words, the player application invokes a part of the interface protocol that is provided by the hardware abstraction layer. These modules provided by the hardware abstraction layer are independent of each other. Therefore, the player application can control, by invoking a module, the underlying hardware to perform an operation in a plurality of operations that need to be performed to play the television program. In this way, the player application invokes the different modules in sequence, so that the underlying hardware can perform a series of operations that need to be performed to play the television program, so as to finally play the television program.

These reference functions provided by the foregoing modules are described in detail below with reference to FIG. 3.

The following describes, with reference to FIG. 3, a method 300 for playing a television program in an embodiment of this application. Working procedures of the foregoing modules at the hardware abstraction layer are introduced into a description process of the method 300.

Figure 4A:
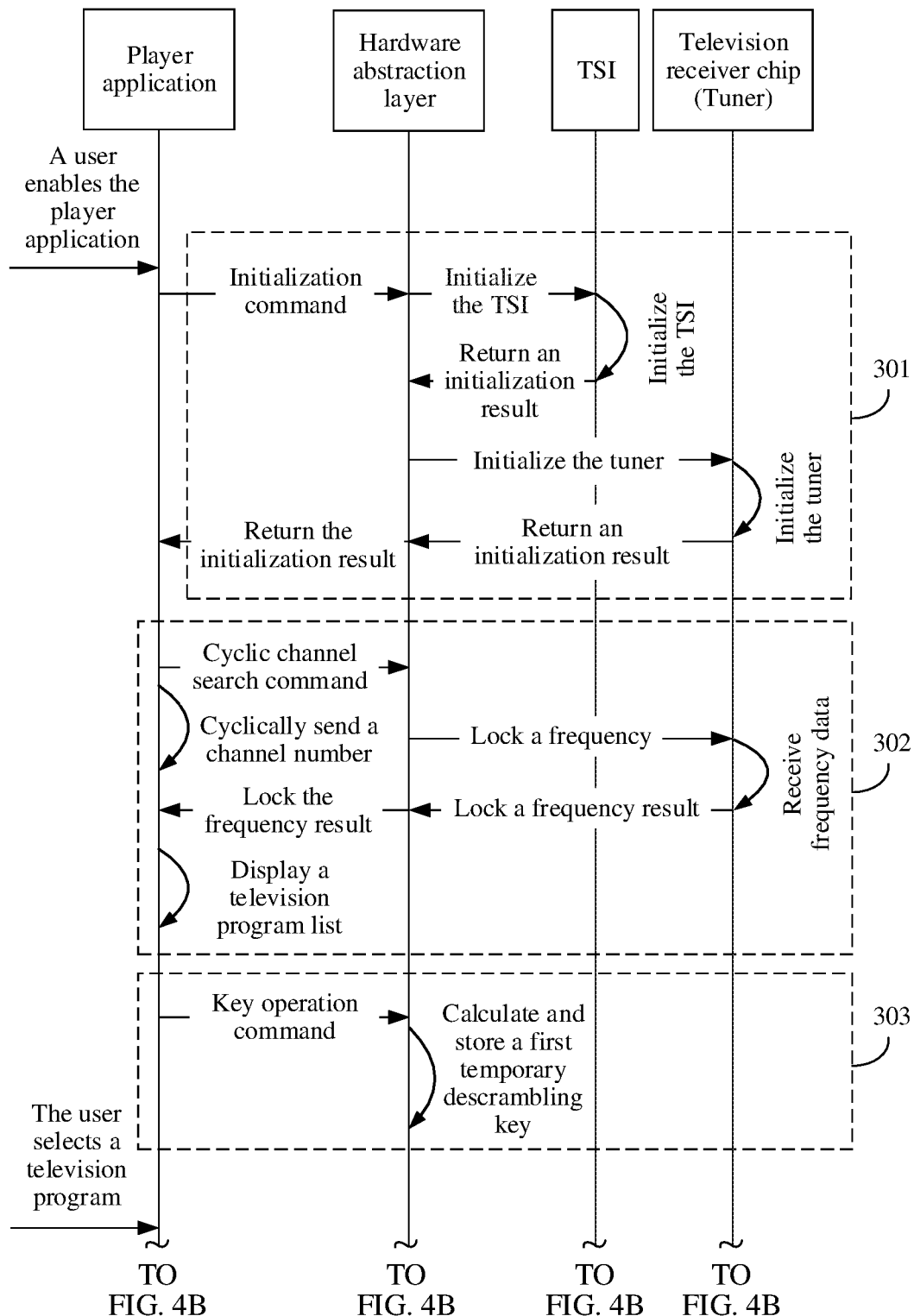
FIG. 4A, FIG. 4B, and FIG. 4C are a schematic diagram of a working procedure of a method 300 for playing a television program according to an embodiment of this application.
Figure 4B:
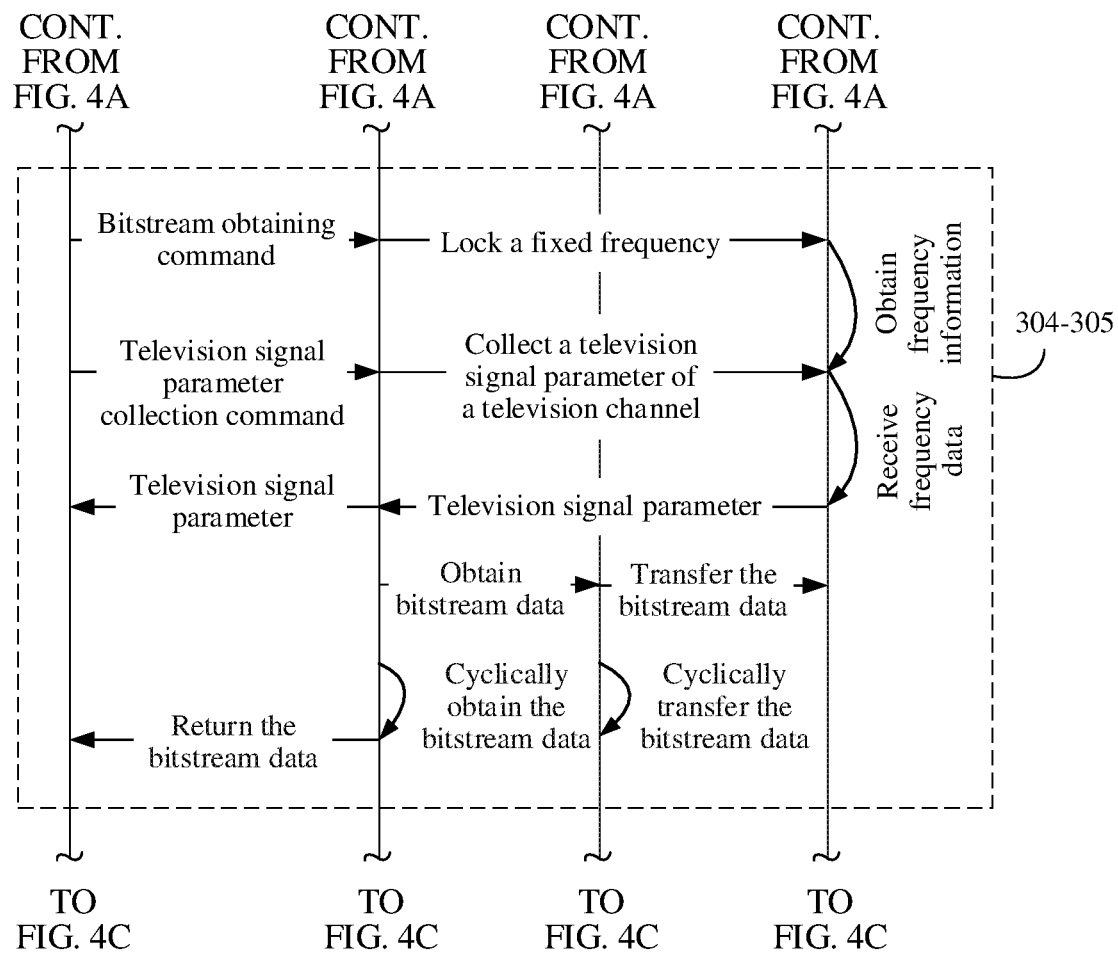
Figure 4C:
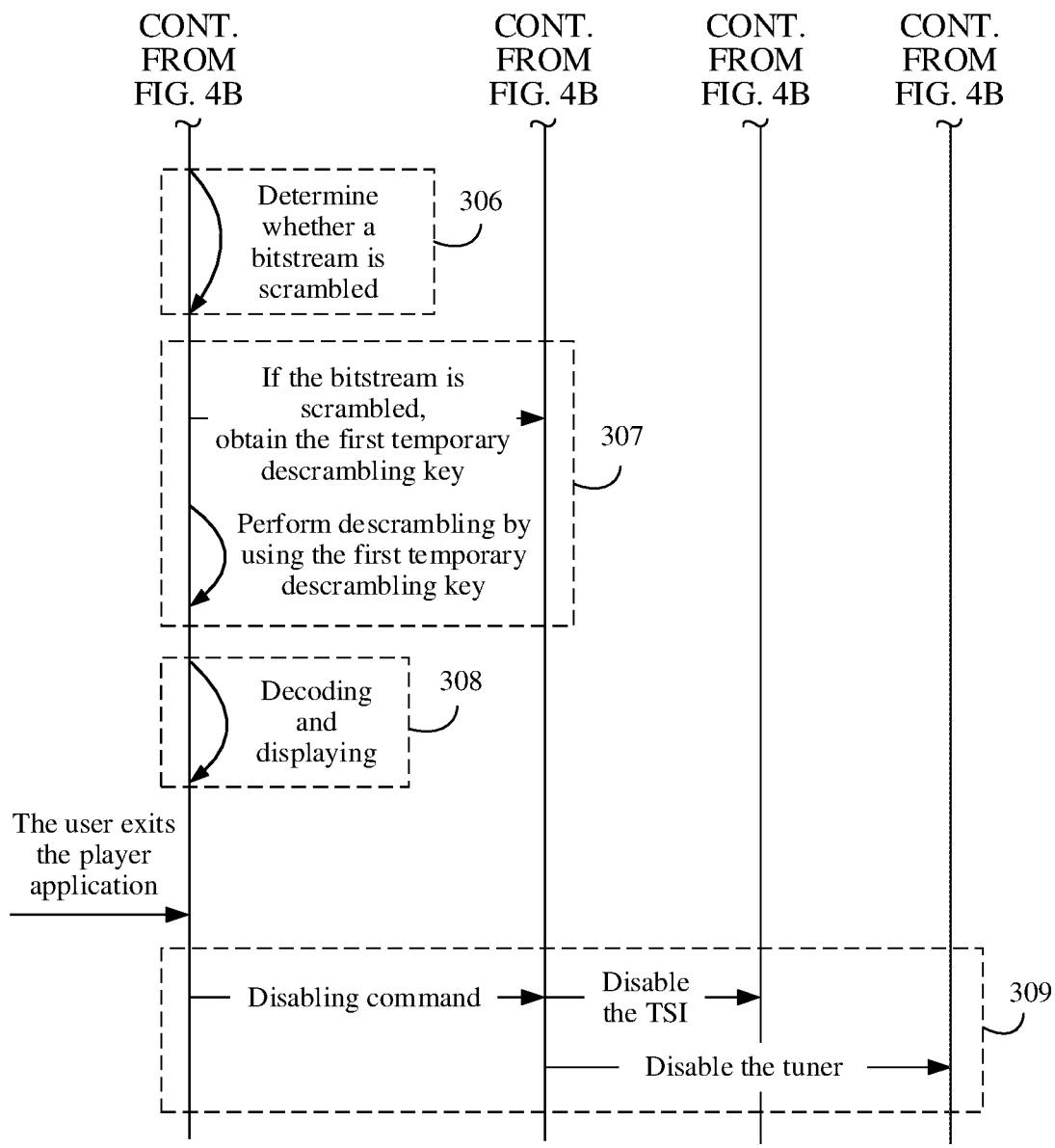

FIG. 4A, FIG. 4B, and FIG. 4C are a flowchart of a method 300 for playing a television program according to an embodiment of this application.

301. Perform Initialization.

A player application sends an initialization command to a hardware abstraction layer through a first interface. The hardware abstraction layer sends an initialization instruction to a driver (denoted as a first driver below) of a television receiver chip through a second interface. The first driver executes the initialization instruction, to perform an initialization operation on the television receiver chip, so as to prepare for receiving a television signal.

Optionally, if a TSI is used between a master chip and the television receiver chip, in step 301, in addition to sending the initialization instruction to the driver of the television receiver chip, the hardware abstraction layer needs to send an initialization instruction to a driver (denoted as a second driver below) of the TSI. The second driver executes the initialization instruction to complete initialization of the TSI, so as to prepare for subsequently transmitting a bitstream of a television program through the TSI.

After underlying hardware (for example, the television receiver chip, or the television receiver chip and the TSI) completes receiving initialization, a hardware driver layer returns an initialization result to the hardware abstraction layer through the second interface. The hardware abstraction layer returns the initialization result to the player application at an application layer through the first interface.

Specifically, the initialization may be implemented by the player application by invoking a reference function: Public int TunnerStart ( ). A return value int indicates the initialization result. The initialization result includes an initialization success and an initialization failure.

It may be understood that in this embodiment of this application, the first interface and the second interface may be considered as reference functions. Therefore, a person skilled in the art may understand a relationship between the reference function and the module at the hardware abstraction layer, the first interface, and the second interface described in the embodiments of this application.

The initialization is used as an example. The player application controls, by invoking the reference function Public int TunnerStart ( ), the television receiver chip to perform the initialization operation.

Another reference function described below has a similar correspondence with the first interface, the second interface, and a module at the hardware abstraction layer. Details are not described herein again.

If the initialization fails, the player application terminates a subsequent action, and displays prompt information to a user in an interface of the player application, for example, displays "initialization fails".

If the initialization succeeds, step 302 is performed.

302. Perform a Cyclic Channel Search.

The player application sends a cyclic channel search command to the hardware abstraction layer through the first interface. The hardware abstraction layer sends a cyclic channel search instruction to the first driver at the hardware driver layer through the second interface. The first driver executes the cyclic channel search instruction, so that the television receiver chip performs the cyclic channel search operation.

A channel search may also be referred to as channel locking. The television receiver chip completes signal detection on all television channels, and outputs a television program list based on a found television program.

In this embodiment of this application, the cyclic channel search module 202 not only supports the cyclic channel search, but also supports a channel search on a single television channel. In a scenario in which no signal is locked on a single channel, ideal channel search duration needs to be less than 600 ms.

Step 302: The player application may implement, by invoking a reference function: public int tunerxCsTuning (IN int tunerBand, IN int ch, OUT int[ ] lockFlg), the cyclic channel search performed by the television receiver chip.

The parameter tunerBand indicates a trial production mode of a television channel, for example, UF and US. The UF indicates high definition 13(Full)-seg using BW13, and the US indicates standard definition 1-seg using BW1.

The parameter lockFlg is used to indicate a channel search result. For example, if 0 is returned, it indicates that the channel search succeeds; or if 1 is returned, it indicates that the channel search fails.

The television program list that is output by the television receiver chip is returned by the first driver to the hardware abstraction layer through the second interface. The hardware abstraction layer returns the television program list to the player application through the first interface.

In a process of performing step 302, that is, during the cyclic channel search, the player application sends a key operation command to the hardware abstraction layer through the first interface. The hardware abstraction layer (specifically, the key module 203) performs step 303 based on the key operation command.

In other words, in this embodiment of this application, the cyclic channel search (in step 302) and calculation of a descrambling key (in step 303) are performed at the same time.

303. Calculate the Descrambling Key.

The key module 203 parses key factors of a current television program, and calculates a descrambling key of the current television program based on a soft Base algorithm and the key factors obtained through parsing. After obtaining the descrambling key through calculation, the key module 203 stores the descrambling key.

In this embodiment of this application, the key factors mainly include an entitlement management message (Entitlement Management Message, EMM) and an entitlement control message (Entitlement Control Message, ECM). For a process of parsing the key factors EMM and ECM, refer to the prior art. For the soft Base algorithm, refer to the prior art. Details are not described herein.

It should be noted that a change period of the EMM is relatively long, and is usually more than several days. However, the ECM changes very frequently and changes basically every second. Therefore, in this embodiment of this application, when the user chooses to watch a television program for the first time, the hardware abstraction layer parses an EMM and an ECM that are of the television program, and stores the EMM. In addition, the hardware abstraction layer calculates a temporary descrambling key of the television program based on the EMM and the ECM, and stores the temporary descrambling key. Because the ECM changes very frequently, the hardware abstraction layer needs to reparse the ECM each time the user selects a television program. Even if a television program that has just been watched is selected, the ECM also needs to be reparsed. However, the hardware abstraction layer uses the stored temporary descrambling key of the television program to check the EMM, to determine whether the EMM of the television program has changed. If the check on the EMM fails, it indicates that the EMM has changed. In this case, the hardware abstraction layer needs to reparse the EMM of the television program. If the check succeeds, the EMM does not need to be reparsed. If the EMM does not change, a time for parsing the EMM can be reduced by approximately 3 to 10 seconds. Because the change period of the EMM is usually more than several days, the time for parsing the EMM can be reduced in most cases in this solution.

In this embodiment of this application, the descrambling key may also be referred to as a temporary descrambling key. For ease of differentiation, the descrambling key that is of the target television program and that is calculated and stored in step 303 is referred to as a first temporary descrambling key below.

The current television program herein may be the last watched television program in a record of watching television programs by the user that is stored in the player application. Alternatively, if the user uses the player application for the first time to watch a television program, the current television program may be any one of television programs found in a cyclic channel search process. The player application may choose, according to a preset policy, to parse key factors of a television program (also including the target television program), and calculate a temporary descrambling key of the television program based on the key factors obtained through parsing.

It should be understood that the descrambling key may also be referred to as the temporary descrambling key because key factors of a television program are not fixed. For a scrambled television program, to ensure security of a descrambling key of the scrambled television program, key factors change at intervals. Therefore, it may be considered that the descrambling key obtained through calculation based on the changed key factors is also temporary.

The descrambling key may be calculated by the player application by invoking a reference function N/A.

After receiving the program list, the player application performs step 304.

304. Obtain a Bitstream of the Target Television Program.

The player application sends a bitstream obtaining command to the hardware abstraction layer through the first interface. The hardware abstraction layer sends a bitstream obtaining instruction to the first driver through the second interface. The first driver executes the bitstream obtaining instruction, so that the television receiver chip receives the bitstream of the target television program.

The first driver returns, to the bitstream obtaining module 205 at the hardware abstraction layer through the second interface, the bitstream that is of the target television program and that is received by the television receiver chip. The bitstream obtaining module 205 returns the bitstream of the target television program to the player application through the first interface.

Optionally, in step 304, if the bitstream is transmitted between the master chip of a terminal device and the television receiver chip through an SPI interface, the first driver obtains, through the SPI interface, the bitstream that is of the target television program and that is received by the television receiver chip. If the bitstream is transmitted between the master chip and the television receiver chip through the TSI, the first driver returns, through the TSI, the bitstream that is of the target television program and that is obtained by the television receiver chip to the bitstream obtaining module 205 at the hardware abstraction layer.

Specifically, the bitstream of the target television program may be obtained by the player application by invoking reference functions public int tunerxTsStar ( ), public int tunerxTsRead (IN uint32_t*size, OUT uint8_t*data, IN uint32_t*pktsize), and public int tunerxTsStop ( ).

The reference function public int tunerxTsStart (is used to configure parameter information of the TSI, and enable the television receiver chip to receive the bitstream. The parameter information of the TSI includes but is not limited to a size (188/204/192 bytes) of data received in each frame, an advanced encryption standard (Advanced Encryption Standard, AES) of the data, an SPI protocol parameter, and the like.

The reference function public int tunerxTsRead (IN uint32_t*size, OUT uint8_t*data, IN uint32_t*pktsize) is used to provide the TSI on which the player application obtains the bitstream. Herein, size is a length of data that needs to be obtained by the player application; data is a pointer used by the player application to obtain data; and Pktsize is a size of a data packet required by the player application, and can be set to 188.

Optionally, the method 300 further includes step 305. Step 304 and step 305 are performed at the same time, and numbers of the steps do not represent an execution sequence.

305. Collect a Television Signal Parameter.

The player application sends a television signal parameter collection command to the hardware abstraction layer through the first interface. The hardware abstraction layer sends a television signal parameter collection instruction to the first driver at the hardware driver layer through the second interface. The first driver executes the television signal parameter collection instruction, so that the television receiver chip performs an operation of collecting the television signal parameter. The television receiver chip collects a television signal parameter of each television channel or a television channel selected by the user.

As described in the foregoing description of the television signal parameter collection module 204, a television signal parameter of a television channel may be used to measure quality of a television signal of the television channel. The television signal parameter includes but is not limited to the following:

transmission and multiplexing configuration control (Transmission and Multiplexing Configuration Control, TMCC) information, a received signal strength indication (Received Signal Strength Indication, RSSI), a carrier-to-noise ratio (Carrier noise, CN), a synchronization (Synchronization, which can be abbreviated to sync) signal, a bit error ratio (Bit Error Radio, BER), or the like.

In this embodiment of this application, the player application can support, by invoking the following reference function public int tunerxGetMonInfo(inout TunerMonitoringInfo tunerMonitoringInfo), an interface for obtaining a television signal parameter set.

Herein, tunerMonitoringInfo is used to define a parameter set, including sync, TMCC, an RSSI, a CN, and Bper. A structure can be referenced as follows:

```
struct_mon_info {
    tuner_syncinfo_t sync; //!<Synchronization
    tuner_rssiinfo_t rssi; //!<RSSI parameter
    tuner_tmccinfo_t tmcc; //!<TMCC information
    tuner_cninfo_t cn; //!<CN parameter
    tuner_bperinfo_t bp1; //!<Measurement result of BER/per
sub-system 1
    tuner_bperinfo_t bp2; //!<Measurement result of BER/per
sub-system 2
    }.
```

Alternatively, the player application can support, by invoking each of the following reference functions, an interface for obtaining a single television signal parameter:

```
int tunerxGetTmccInfo(inout TunerTMCCInfo tunerTMCCInfo) for
obtaining a TMCC signal parameter;
    int tunerxGetRssiInfo(inout TunerRSSIInfo tunerRSSIInfo) for
obtaining an RSSI signal parameter;
    int tunerxGetSyncInfo(inout TunerSyncInfo tunerSyncInfo) for
obtaining a sync signal parameter;
    int tunerxGetCnInfo(inout TunerCNInfo tunerACInfo) for obtaining a
CN signal parameter; and
    int tunerxGetBper(inout TunerBperInfo tunerBperInfo) for obtaining a
Bper signal parameter.
```

The first driver (namely, the driver of the television receiver chip) returns, to the hardware abstraction layer through the second interface, television signal parameters that are of all television channels and that are collected by the television receiver chip. The hardware abstraction layer returns these television signal parameters to the player application through the first interface.

The player application may learn of quality of a television signal of each television channel based on a television signal parameter of each television channel. Based on this, the player application can formulate corresponding playback policies for different television channels.

For example, if the user selects a television channel with poorer television signal quality to watch a television program, the player application may reduce playback resolution (for example, perform playback in a standard definition mode), to ensure smooth playback. However, if the user selects a television channel with better television signal quality, the player application may perform playback at higher resolution (for example, in a high definition mode), to improve image playback quality, and improve user experience.

After obtaining the bitstream of the target television program, the player application performs step 306.

306. Determine whether the target television program is scrambled.

The user selects a television program (referred to as a target television program below) in the interface of the player application, and the player application determines whether the target television program is scrambled. If the target television program is scrambled, the player application performs step 307. If the target television program is not scrambled, the player application performs step 308.

307. Descramble the Scrambled Target Television Program.

The player application requests, through the first interface, the hardware abstraction layer to obtain a temporary descrambling key of the target television program. The key module returns the stored first temporary descrambling key of the target television program to the player application through the first interface.

The player application descrambles the scrambled target television program by using the first temporary descrambling key.

If the descrambling fails, the player application sends a second key operation command to the hardware abstraction layer.

The hardware abstraction layer parses a second ECM of the target television program based on the second key operation command. After obtaining the second ECM through computation, the hardware abstraction layer recalculates the descrambling key of the target television program based on the second ECM and the stored EMM. For ease of distinguishing from the first temporary descrambling key, the descrambling key obtained through recalculation is referred to as a second temporary descrambling key. Then, the player application descrambles the target television program by using the second temporary descrambling key. (A key operation procedure is described in detail in FIG. 5 below.)

If the descrambling succeeds, the player application performs step 308.

308. Decode the Bitstream of the Target Television Program, and Play Decoded Audio and Video Data.

The player application decodes the received bitstream of the target television program, to obtain the audio and video data of the target television program. The player application plays the audio and video data, and presents the target television program to the user in the interface of the player application.

Optionally, if step 305 is performed, the player application may determine a playback policy of the target television program based on the obtained television signal parameter of the target television program, and play the target television program based on the playback policy.

It should be understood that the television signal parameter may be connected in real time. Therefore, as the television signal parameter changes, the playback policy of the television program may also be continuously adjusted.

A process of playing the television program is described in step 301 to step 308.

Subsequently, in the process in which the player application plays the television program, if the user chooses to exit the player application, the player performs step 309.

309. Disable Receiving of the Bitstream of the Target Television Program.

The player application sends a disabling command to the disabling module 206 at the hardware abstraction layer through the first interface. The disabling module 206 sends a disabling instruction to the first driver at the hardware driver layer through the second interface.

The first driver executes the disabling instruction, to perform a disabling operation on the television receiver chip, so as to stop receiving the bitstream of the television program.

Further, if the bitstream is transmitted between the master chip and the television receiver chip through the TSI, the disabling module 206 needs to send the disabling instruction to the second driver.

The second driver executes the disabling instruction, to complete disabling of the TSI.

After the disabling work is completed, the first driver and the second driver return a disabling result to the disabling module 205 at the hardware abstraction layer through the second interface. The disabling module 205 returns the disabling result to the player application through the first interface.

Specifically, the player application can control the disabling work of the television receiver chip and the TSI by invoking a reference function public void tunerxEnd ( ). For example, the television receiver chip is powered off, and a virtual device node resource on the television receiver chip is released.

The foregoing describes in detail the method for playing a television program in the embodiments of this application with reference to FIG. 2 to FIG. 4A, FIG. 4B, and FIG. 4C.

Figure 5:
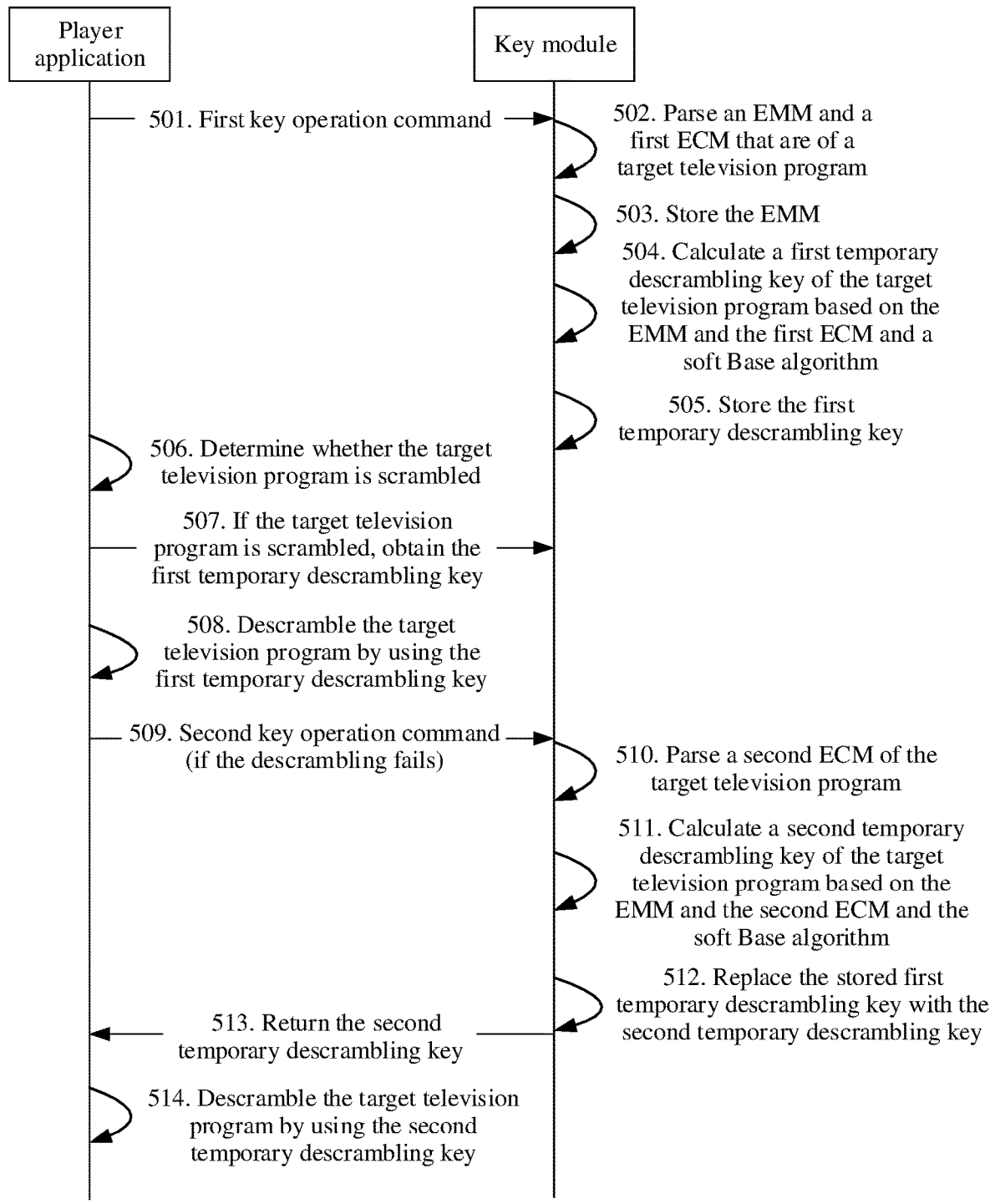
FIG. 5 is a schematic diagram in which a player application invokes a key module to calculate a descrambling key.
Figure 6:
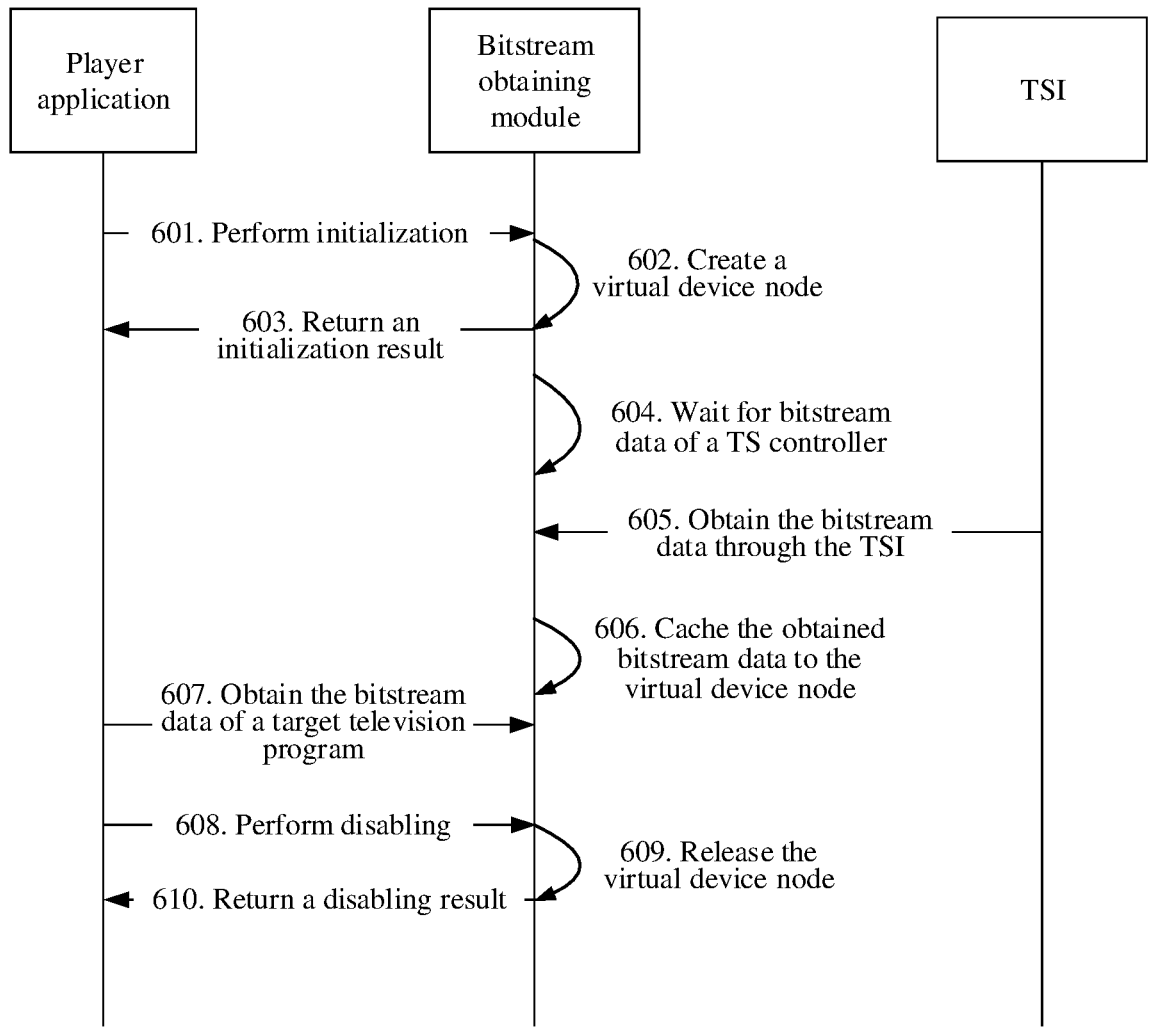
FIG. 6 is a schematic diagram in which a player application invokes a bitstream obtaining module to obtain a bitstream of a television program.

The following further describes internal processing procedures of the key module 203 and the bitstream obtaining module 204 at the hardware abstraction layer with reference to FIG. 5 and FIG. 6. In addition, for the steps and processing procedures that are described in detail in FIG. 4A, FIG. 4B, and FIG. 4C, details are not described in FIG. 5 and FIG. 6 again.

FIG. 5 is a schematic diagram of a processing procedure in which a player application invokes a key module.

501. The player application sends a first key operation command to a hardware abstraction layer.

Specifically, a descrambling key is calculated by the key module 203 at the hardware abstraction layer.

502. The key module computes an EMM and a first ECM that are of a target television program.

503. The key module stores the EMM.

The hardware abstraction layer stores the EMM, so that when a user subsequently selects a channel or switches a channel, only the ECM needs to be reparsed. In this way, a time for parsing the EMM can be reduced by approximately 3 to 10 seconds.

504. The key module calculates a first temporary descrambling key of the target television program based on the EMM and the first ECM and a Base algorithm.

505. The key module stores the first temporary descrambling key.

506. The player application determines whether the target television program is scrambled.

507. If the target television program is scrambled, the player application requests the key module to obtain the first temporary descrambling key of the target television program.

508. The player application descrambles the target television program by using the first temporary descrambling key.

509. If the descrambling fails, the player application sends a second key operation command to the hardware abstraction layer.

510. The key module computes a second ECM of the target television program.

511. The key module calculates a second temporary descrambling key of the target television program based on the stored EMM and the second ECM and the soft Base algorithm.

512. The key module replaces the stored first temporary descrambling key with the second temporary descrambling key.

513. The key module returns the second temporary descrambling key to the player application.

514. The player application descrambles the target television program by using the second temporary descrambling key.

It should be noted that an example in which the hardware abstraction layer calculates and stores the temporary descrambling key of the target television program is used in FIG. 5 to describe a procedure in which the hardware abstraction layer calculates the temporary descrambling key of the television program. For any television program found in a cyclic channel search process, procedures in which the hardware abstraction layer calculates temporary descrambling keys of the any television program are the same.

In this embodiment of this application, parsing of the key factors EMM and ECM, storage of the EMM, and an operation of the temporary descrambling key are all performed at the hardware abstraction layer, and are specifically performed by the key module 203 at the hardware abstraction layer. When determining that a television program is scrambled, the player application requests a descrambling key from the hardware abstraction layer, and descrambles the scrambled television program based on the descrambling key returned by the hardware abstraction layer.

It may be understood that if the player application calculates the descrambling key, relatively large memory space needs to be created to store a bitstream. Therefore, in this embodiment of this application, the descrambling key is set to be calculated at the hardware abstraction layer. The player application requests the descrambling key from the hardware abstraction layer only when the player application needs to descramble the television program. After obtaining the descrambling key, the player application performs a descrambling operation. In this way, consumption of memory space can be reduced.

In the procedure of calculating the descrambling key in this embodiment of this application, in some channel selection or channel switching scenarios, 3 to 15 seconds can be saved. For example, in a scenario in which a user starts the player application for the first time, calculation of the descrambling key and a cyclic channel search are performed at the same time, so that a time for calculating the descrambling key can be saved. For another example, in a scenario in which a television program on a same television channel is played, the player application may directly descramble the television program by using a previously stored descrambling key.

FIG. 6 is a schematic diagram of a processing procedure in which a player application invokes a bitstream obtaining module.

601. The player application sends an initialization command.

602. The bitstream obtaining module at a hardware abstraction layer creates a virtual device node.

Herein, creating the virtual device node is a part of initialization performed by the bitstream obtaining module.

603. The bitstream obtaining module returns an initialization result to the player application.

604. The bitstream obtaining module waits for bitstream data of a TS controller.

605. The bitstream obtaining module obtains the bitstream data through a TSI.

In step 605, after a television receiver chip starts to receive a bitstream of a target television program, the bitstream obtaining module obtains the bitstream data in real time through the TSI.

606. The bitstream obtaining module caches the obtained bitstream data to the virtual device node.

607. The player application cyclically captures, in a select mode, the bitstream data cached by the bitstream obtaining module.

Subsequently, after a user exits the player application, the player application performs step 608.

608. The player application sends a disabling command.

609. The bitstream obtaining module releases the virtual device node.

610. The bitstream obtaining module returns a disabling result to the player application.

In FIG. 6, the player application obtains the bitstream data of the target television program through the TSI by invoking the bitstream obtaining module 204.

In this embodiment of this application, the hardware abstraction layer is disposed between a hardware driver layer and the player application at an application layer, so that the hardware abstraction layer shields the player application from an interface difference of television receiver chips, and provides a unified interface protocol between the player application and the television receiver chip, to be compatible with and support television receiver chips with different interfaces.

In addition, this application provides a computer readable storage medium. The computer readable storage medium stores an instruction, and when the instruction is run on a computer, the computer is enabled to perform the method for playing a television program in the foregoing embodiments.

This application further provides a computer program product. The computer program product includes computer program code, and when the computer program code is run on a computer, the computer is enabled to perform the method for playing a television program described in any one of the foregoing embodiments.

This application further provides a chip (or a chip system), including a memory and a processor. The memory is configured to store a computer program, and the processor is configured to invoke the computer program from the memory and run the computer program, so that a terminal device on which the chip is installed performs a corresponding procedure and/or operation in the method for playing a television program in this application.

The chip described herein may be the master chip of the terminal device described in the embodiments of this application.

Optionally, the memory and the memory may be physically independent units, or the memory may be integrated into the processor.

In the foregoing embodiments, the processor may be a central processing unit (Central Processing Unit, CPU), a microprocessor, an application-specific integrated circuit (Application-Specific Integrated Circuit, ASIC), one or more integrated circuits configured to control program execution of the solutions of this application, and the like. For example, the processor may include a digital signal processor device, a microprocessor device, an analog-to-digital converter, and a digital-to-analog converter. The processor may allocate control and signal processing functions of mobile devices between these devices based on respective functions of the devices. In addition, the processor may include functions for operating one or more software programs, and the software programs may be stored in the memory.

The functions of the processor may be implemented by hardware, or may be implemented by hardware executing corresponding software. The hardware or the software includes one or more modules corresponding to the foregoing functions.

The memory may be a read-only memory (Read-Only Memory, ROM) or another type of static storage device that can store static information and an instruction, a random access memory (Random Access Memory, RAM), or another type of dynamic storage device that can store information and an instruction. The memory may alternatively be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited herein.

With reference to the foregoing descriptions, a person skilled in the art may be aware that the methods in the embodiments in the specification may be implemented by hardware (for example, a logic circuit), or software, or a combination of hardware and software. Whether the methods are performed by hardware or software depends on particular applications and design constraints of the technical solutions. A person skilled in the art may use different methods to implement the described functions for each particular application, but it should not be considered that the implementation goes beyond the scope of this application.

When the functions are implemented in a form of software and sold or used as an independent product, the functions may be stored in a computer readable storage medium. In this case, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a terminal device, the terminal device comprising hardware and being configured to implement an application layer, an operating system layer, and a hardware driver layer, the operating system layer comprising a hardware abstraction layer, the hardware comprising a master chip and a television receiver chip, and the method comprising:

sending, by a player application at the application layer, a cyclic channel search command to the hardware abstraction layer through a first interface;

sending, by the player application, a first key operation command to the hardware abstraction layer through the first interface;

sending, by the hardware abstraction layer, a cyclic channel search instruction to a first driver at the hardware driver layer through a second interface, wherein the first driver is a driver of the television receiver chip;

executing, by the first driver, the cyclic channel search instruction, causing the television receiver chip to search for television signals of television channels, and to output a television program list based on found television signals;

returning, by the first driver, the television program list to the hardware abstraction layer through the second interface;

parsing, by the hardware abstraction layer, an entitlement management message (EMM) and a first entitlement control message (ECM) of a target television program based on the first key operation command, and storing the EMM;

calculating, by the hardware abstraction layer, a first temporary descrambling key of the target television program based on the EMM and the first ECM;

storing, by the hardware abstraction layer, the first temporary descrambling key of the target television program;

returning, by the hardware abstraction layer, the television program list to the player application through the first interface;

receiving, by the hardware abstraction layer through the first interface, a bitstream obtaining command sent by the player application, wherein the bitstream obtaining command requests to obtain a bitstream of the target television program, and wherein the target television program is selected by a user;

sending, by the hardware abstraction layer, a bitstream obtaining instruction to the first driver through the second interface;

executing, by the first driver, the bitstream obtaining instruction, causing the television receiver chip to receive the bitstream of the target television program;

obtaining, by the hardware abstraction layer, the bitstream of the target television program from the first driver through the second interface;

sending, by the hardware abstraction layer, the bitstream of the target television program to the player application through the first interface;

decoding, by the player application, the bitstream of the target television program; and playing, by the player application, decoded audio and video data.

2. The method according to claim 1, wherein obtaining, by the hardware abstraction layer, the bitstream of the target television program from the first driver through the second interface comprises:

obtaining, by the hardware abstraction layer, the bitstream of the target television program from a transport stream interface (TSI) through the second interface, wherein the TSI is an interface configured for transmitting a transport stream (TS) between the master chip and the television receiver chip.

3. The method according to claim 1, wherein before decoding, by the player application, the bitstream of the target television program, the method further comprises:

determining, by the player application, whether the bitstream of the target television program is scrambled;

in response to determining the bitstream of the target television program is scrambled, obtaining, by the player application, the first temporary descrambling key of the target television program from the hardware abstraction layer through the first interface and descrambling, by the player application, the bitstream of the target television program using the first temporary descrambling key; and wherein decoding, by the player application, the bitstream of the target television program, and playing decoded audio and video data, comprises:
in response to the descrambling succeeding, decoding, by the player application, the bitstream of the target television program after the descrambling, and playing the decoded audio and video data.

4. The method according to claim 3, further comprising:

in response to the descrambling failing, sending, by the player application, a second key operation command to the hardware abstraction layer through the first interface;

parsing, by the hardware abstraction layer, a second ECM of the target television program based on the second key operation command;

calculating, by the hardware abstraction layer, a second temporary descrambling key of the target television program based on the second ECM and the stored EMM;

replacing, by the hardware abstraction layer, the stored first temporary descrambling key with the second temporary descrambling key;

returning, by the hardware abstraction layer, the second temporary descrambling key to the player application; and descrambling, by the player application, the target television program using the second temporary descrambling key.

5. The method according to claim 1, further comprising:

sending, by the player application, an initialization command to the hardware abstraction layer through the first interface based on an instruction entered by the user to start the player application;

sending, by the hardware abstraction layer, an initialization instruction to the first driver through the second interface; and executing, by the first driver, the initialization instruction, causing the television receiver chip to perform an initialization operation.

6. The method according to claim 5, further comprising:

sending, by the hardware abstraction layer, an initialization instruction to a second driver through the second interface, wherein the second driver is on a transport stream interface (TSI); and executing, by the second driver, the initialization instruction to initialize the TSI.

7. The method according to claim 1, further comprising:
sending, by the player application, a disabling command to the hardware abstraction layer through the first interface based on an instruction entered by the user to exit the player application;
sending, by the hardware abstraction layer, a disabling instruction to the first driver through the second interface; and
executing, by the first driver, the disabling instruction, to perform a disabling operation on the television receiver chip.

8. The method according to claim 7, further comprising:
sending, by the hardware abstraction layer, the disabling instruction to a second driver through the second interface; and
executing, by the second driver, the disabling instruction to disable a transport stream interface (TSI).

9. A terminal device, comprising:
a master chip; and
a television receiver chip;
wherein the terminal device is configured to implement an application layer, an operating system layer, a hardware driver layer, and a hardware layer, and the operating system layer comprises a hardware abstraction layer;
wherein the hardware abstraction layer is configured to:
receive, through a first interface, a bitstream obtaining command sent by a player application at the application layer, wherein the bitstream obtaining command requests to obtain a bitstream of a target television program selected by a user; and
send a bitstream obtaining instruction to a first driver at the hardware driver layer through a second interface, wherein the first driver is a driver of the television receiver chip;
wherein the first driver is configured to execute the bitstream obtaining instruction, to cause the television receiver chip to receive the bitstream of the target television program;
wherein the hardware abstraction layer is further configured to:
obtain the bitstream of the target television program from the first driver through the second interface; and
send the bitstream of the target television program to the player application through the first interface;
wherein the player application is configured to:
decode the bitstream of the target television program, and play decoded audio and video data; and
send a disabling command to the hardware abstraction layer through the first interface based on an instruction entered by the user to exit the player application;
wherein the hardware abstraction layer is further configured to send a disabling instruction to the first driver through the second interface; and
wherein the first driver is further configured to execute the disabling instruction, to perform a disabling operation on the television receiver chip.

10. The terminal device according to claim 9, wherein the hardware abstraction layer is further configured to obtain the bitstream of the target television program through a transport stream interface (TSI), wherein the TSI is an interface for transmitting a transport stream (TS) between the master chip and the television receiver chip.

11. The terminal device according to claim 9, wherein:
the player application is further configured to:
send a cyclic channel search command to the hardware abstraction layer through the first interface; and
send a first key operation command to the hardware abstraction layer through the first interface;
the hardware abstraction layer is further configured to send a cyclic channel search instruction to the first driver through the second interface;
the first driver is further configured to:
execute the cyclic channel search instruction, causing the television receiver chip to search for television signals of all television channels, and to output a television program list based on the found television signals; and
return the television program list to the hardware abstraction layer through the second interface; and
the hardware abstraction layer is further configured to:
parse an entitlement management message (EMM) and a first entitlement control message (ECM) of the target television program based on the first key operation command, and store the EMM;
calculate a first temporary descrambling key of the target television program based on the EMM and the first ECM;
store the first temporary descrambling key; and
return the television program list to the player application through the first interface.

12. The terminal device according to claim 11, wherein the player application is further configured to:
before decoding the bitstream of the target television program, determine whether the bitstream of the target television program is scrambled;
in response to determining the bitstream of the target television program is scrambled, obtain the first temporary descrambling key of the target television program from the hardware abstraction layer through the first interface;
descramble the bitstream of the target television program using the first temporary descrambling key; and
in response to the descrambling succeeding, decode the bitstream of the target television program, and play the decoded audio and video data.

13. The terminal device according to claim 12, wherein:
the player application is further configured to:
in response to the descrambling failing, send a second key operation command to the hardware abstraction layer through the first interface;
the hardware abstraction layer is further configured to:
parse a second ECM of the target television program based on the second key operation command;
calculate a second temporary descrambling key of the target television program based on the second ECM and the stored EMM;
replace the stored first temporary descrambling key with the second temporary descrambling key; and
return the second temporary descrambling key to the player application; and
the player application is further configured to descramble the target television program using the second temporary descrambling key.

14. The terminal device according to claim 9, wherein:
the player application is further configured to send an initialization command to the hardware abstraction layer through the first interface based on an instruction entered by the user to start the player application;
the hardware abstraction layer is further configured to send an initialization instruction to the first driver through the second interface; and the first driver is further configured to execute the initialization instruction, causing the television receiver chip to perform an initialization operation.

15. The terminal device according to claim 14, wherein:

the hardware abstraction layer is further configured to send an initialization instruction to a second driver through the second interface, wherein the second driver is a driver on a transport stream interface (TSI); and the second driver is further configured to execute the initialization instruction to initialize the TSI.

16. The terminal device according to claim 9, wherein:

the player application is further configured to, when the player application sends the bitstream obtaining command to the hardware abstraction layer, send a television signal parameter collection command to the hardware abstraction layer through the first interface;

the hardware abstraction layer is further configured to send a television signal parameter collection instruction to the first driver through the second interface;

the first driver is further configured to execute the television signal parameter collection instruction, causing the television receiver chip to collect a television signal parameter of a target television channel, wherein the television signal parameter of the target television channel indicates a quality of a television signal of the target television channel, and the target television channel is a television channel on which the target television program is sent;

the hardware abstraction layer is further configured to receive, from the first driver through the second interface, a television signal parameter of each television channel; and the player application is further configured to:
  receive, through the first interface from the hardware abstraction layer, the television signal parameter of each television channel;
  determine a playback policy of each television channel based on the television signal parameter of each television channel; and
  play the decoded audio and video data according to a playback policy of the target television program.

17. The terminal device according to claim 9, wherein:

the hardware abstraction layer is further configured to send the disabling instruction to a second driver through the second interface; and the second driver is further configured to execute the disabling instruction to disable a transport stream interface (TSI).

* * * * *